Patented Jan. 27, 1953

2,626,869

UNITED STATES PATENT OFFICE 2,626,869

PRODUCTION OF RUTIN CONCENTRATES

Harry Miller, Kansas City, Mo.

No Drawing. Application January 12, 1950,
Serial No. 138,269

12 Claims. (Cl. 99—11)

This invention relates to the economical production of rutin concentrates.

Rutin, as is known, is a glucoside of quercetin, which occurs in and has been isolated from a number of plants. Dr. Couch and his co-workers (Griffith, Couch and Lindauer, Proc. Soc. Exptl. Biol. Med. 55:228 (1944), reported the extraction of this compound from tobacco and Dr. Couch subsequently determined that buckwheat was an excellent source of rutin. It has since been confirmed by a number of investigators that, to date at least, buckwheat has the highest concentration of rutin in any of the readily available plants and is of the order of 8.5%. The rutin concentration appears to be at a maximum in the blossom stage.

In very recent times rutin has acquired a special and poignant significance. At a recent meeting of the American Medical Society, held in Chicago, the strategic significance of rutin was brought to the attention of physicians. This appears to be indicated in the treatment to reduce or minimize the capillary fragility which is a known effect or concomitant of subjection to the radiation eminating from an atomic bomb.

It is well established that rutin offers a readily available source of material possessing vitamin P-like properties. This would appear to be most satisfactorily established by recent clinical investigation in this field, characteristic of which is that reported at the 109th meeting of the American Chemical Society in a paper by Couch and Griffith entitled "Clinical Studies on Rutin Therapy in Increased Capillary Fragility." As there reported, out of some 1219 patients studied over a prolonged period of time, capillary fragility was reported to have returned to normal in 88% of the cases under treatment. The evidence adducible to date definitely indicates that rutin is useful in controlling capillary fragility.

The present invention relates to a process by which food concentrates high in rutin may economically be produced from readily available source materials.

The fundamental concepts of the invention can be more readily understood and appraised or evaluated from a consideration of a typical preferred procedure in which such concepts are invoked and utilized.

In the preferred mode of procedure under the invention, the source material which is utilized is buckwheat. This preferably is harvested in the blossom stage, or as close thereto as is practicable, so as to insure the highest or maximum content of extractable rutin. The harvested material is then preferably chopped or cut to reduce the size of the particulate units to about one inch or less. The chopped material is then subjected to suitable mechanical pressure to crush the fiber walls and liberate the contained sap or juice. While a number of mechanical units may be utilized for such an expression, it is preferred, for a number of economic reasons, to utilize an efficient mechanical expeller such as an Anderson expeller. Such a nut operates at high efficiency to expel the optimum quantity of liquid at very economic operating costs.

As is known, rutin is somewhat soluble in hot water, but is substantially insoluble in cold water. In the preferred operation, the expressed juice flowing from the expeller is quickly cooled by any suitable cooling means and the effluent is accumulated for continuous or intermittent treatment. Preferably the cooled, expelled juice is subjected to any suitable type of liquid-solids separation so as to separate the soluble solids from the insoluble material including the rutin. Such separation may be effected in one or more centrifuges, suitable filters and the like. As will be appreciated, the essential desideratum of the operation is to segregate the insoluble rutin constituent into a relatively concentrated fraction.

It is particularly to be observed at this point that in the process for the production of rutin, high temperatures should be sedulously avoided. Rutin is distinctly thermolabile. For example, it has been established by experimentation that in as short a period as two minutes, substantially 50% of the rutin content of a given aqueous solution is destroyed. It is to be observed, as a primary precaution, that the concentration and drying of the rutin-containing fraction contemplated herein should be carried out at suitably low temperatures and for this reason drying under vacuum is particularly to be recommended.

The rutin-containing solids fraction separated from the crude juice may be dried directly and preferably as noted, under a vacuum. If desired, this solids fraction may be repulped with water and dried in equipment where contact with elevated temperatures is reduced to very short duration followed by immediate cooling.

It has been determined that the pH of the expressed buckwheat juice is about 5. Rutin is unstable at pH conditions appreciably above 7 and especially so at prolonged, elevated temperatures. It is to be noted, however, that the fraction in which the rutin is isolated also contains nutritiously valuable fat soluble constituents of the plant such, for example, as vitamin E, chlorophyll and carotenes. It is desirable to produce an ultimate product in which this carotene content is stabilized. In the preferred operation, therefore, the juice is adjusted to pH 7 to 7.5. It has been found that under such conditions, if the temperature during drying of the rutin-containing fraction does not exceed about 212° F. and is of short duration, little rutin is lost.

This rutin-containing powder, produced according to the described procedure, preferably should be assayed and diluted to some standard of concentration before pelleting and packaging. Since the product is slightly hygroscopic, it should be stored in a dry atmosphere or in air tight containers.

It will be appreciated that if desired, the described rutin-containing concentrate may be used as a source material for pure rutin. The pure rutin may be extracted from the powder by any approved method as, by preliminary extraction of chlorophyll and other pigments followed by extraction of the rutin with hot water or alcohol or any other satisfactory treatment. The rutin may be recrystallized from hot water, from warm ethyl alcohol or acetic acid by known procedures.

In addition to the rutin, other valuable by-products may be recovered in the process. The press cake from the expeller may be dried and utilized as a cattle feed or may be dried and screened or air classified to separate it into a meal relatively enriched in feed values and an essentially fibrous or cellulosic fraction.

The filtrate obtained by centrifuging or filtering the juice as will be appreciated, contains water soluble constituents including water soluble proteins of high nutritional value. This filtrate may be concentrated to any desired degree or dried down to a powder and marketed as a food or feed concentrate. If desired, the filtrate may be mixed with the press cake or the meal fraction thereof and dried to produce a feed enriched in dietetic values.

It will now be appreciated that the described method provides an effective procedure for producing food concentrates high in rutin and rich in provitamin A and vitamins as well as chlorophyll. It is thus valuable, generally, as a food and is of marked therapeutic value in respect to treatment for the control of capillary fragility. While a preferred modification of the invention has been described, it will be understood that this is given to explain the underlying principles involved and not as limiting the useful scope of the invention to the particular illustrative embodiment.

I claim:

1. A process of treating buckwheat to recover valuable products therefrom which comprises, subjecting cut green buckwheat to mechanical pressure to expell the natural juice, quickly cooling the juice, adjusting the juice to alkalinity, subjecting the juice to a liquid-solids separation and recovering a solids fraction enriched in rutin and carotenes.

2. A process of treating buckwheat to recover valuable products therefrom which comprises, subjecting cut green buckwheat to expel the natural juice, quickly cooling the expelled juice, adjusting the juice to between pH 7 and about 7.5, subjecting the juice to a liquid solid solids separation and recovering a solids fraction enriched in rutin.

3. A process in accordance with claim 1 in which the liquid from the liquid-solids separation step is evaporated to produce a concentrate enriched in the water soluble constituent of the juice.

4. A process in accordance with claim 2 in which the liquid fraction from the liquid-solids separations step is evaporated to produce a concentrate enriched in the water soluble constituents of the juice.

5. A process of treating buckwheat to recover valuable products therefrom which comprises, subjecting cut green buckwheat to mechanical pressure to expell the juice, cooling the juice to a temperature sufficiently low to prevent any substantial dissolution of rutin, adjusting the juice to an alkalinity which favors stabilization of carotenes, subjecting the juice to a liquid-solids separation and recovering a solids fraction enriched in rutin and stabilized carotenes.

6. A process in accordance with claim 1 in which the separated solids fraction is dried at relatively low temperatures under vacuum.

7. A process in accordance with claim 1 in which the separated solids fraction is dried at temperatures not substantially in excess of 212° F. and for the minimum period of time.

8. A process in accordance with claim 2 in which the separated solids fraction is dried at relatively low temperatures under vacuum.

9. A process in accordance with claim 2 in which the separated solids fraction is dried at temperatures not substantially in excess of 212° F. and for a minimal period of time.

10. A process in accordance with claim 2 in which the separated liquid fraction is evaporated to produce a concentrated fraction enriched in the water soluble constituents of the juice.

11. A process in accordance with claim 1 in which the separated solids fraction is repulped with water and dried at elevated temperatures and immediately flash cooled.

12. A process in accordance with claim 2 in which the separated solids fraction is repulped with water and dried at elevated temperatures and immediately flash cooled.

HARRY MILLER.

REFERENCES CITED

The following references are of record in the file of this patent:

UNITED STATES PATENTS

| Number | Name | Date |
| --- | --- | --- |
| 1,195,152 | Rich | Aug. 15, 1916 |

OTHER REFERENCES

"Production of Rutin from Buckwheat," by Esken et al., April 1946, page 9.

The Chemistry and Therapeutic Use of Rutin, by Couch et al., April 1946.

Extraction and Refining of Rutin from Green Buckwheat, by Couch et al., Bu. Agr. & Ind. Chem., July 1947.